(12) United States Patent
Lin et al.

(10) Patent No.: US 12,332,432 B2
(45) Date of Patent: Jun. 17, 2025

(54) TRACKING APPARATUS, METHOD, AND NON-TRANSITORY COMPUTER READABLE STORAGE MEDIUM THEREOF

(71) Applicant: HTC Corporation, Taoyuan (TW)

(72) Inventors: Jyun-Jhong Lin, Taoyuan (TW); Chun-Kai Huang, Taoyuan (TW)

(73) Assignee: HTC Corporation, Taoyuan (TW)

( * ) Notice: Subject to any disclaimer, the term of this patent is extended or adjusted under 35 U.S.C. 154(b) by 0 days.

(21) Appl. No.: 17/810,837

(22) Filed: Jul. 6, 2022

(65) Prior Publication Data

US 2024/0012238 A1 Jan. 11, 2024

(51) Int. Cl.
*G02B 27/00* (2006.01)
*G02B 27/01* (2006.01)
*G06T 7/70* (2017.01)

(52) U.S. Cl.
CPC ....... *G02B 27/0093* (2013.01); *G02B 27/017* (2013.01); *G06T 7/70* (2017.01)

(58) Field of Classification Search
None
See application file for complete search history.

(56) References Cited

U.S. PATENT DOCUMENTS 11,049,277 B1 6/2021 Price et al.
11,164,378 B1* 11/2021 Cowen .................. G01S 13/88

2019/0094981 A1* 3/2019 Bradski ................ G06V 40/168
2020/0387286 A1* 12/2020 Ravasz ................. G06F 3/0482
2021/0312684 A1* 10/2021 Zimmermann ........ G02B 27/01

FOREIGN PATENT DOCUMENTS

| CN | 110139028 A | 8/2019 |
|---|---|---|
| CN | 110794955 A | 2/2020 |
| TW | 202121124 A | 6/2021 |
| WO | 2018/039269 A1 | 3/2018 |

OTHER PUBLICATIONS

The office action of the corresponding Taiwanese application No. 111139442 issued on Sep. 22, 2023.

* cited by examiner

*Primary Examiner* — Ifedayo B Iluyomade
(74) *Attorney, Agent, or Firm* — CKC & Partners Co., LLC

(57) ABSTRACT

A tracking apparatus, method, and non-transitory computer readable storage medium thereof are provided. The apparatus determines whether a target object appears in a field of view, wherein the target object is tracked by a head-mounted display. The apparatus calculates a first pose information corresponding to the target object based on a real-time image in response to determining that the target object appears in the field of view. The apparatus transmits the first pose information to the head-mounted display to make the head-mounted display calculate a fusion pose information of the target object according to the first pose information.

12 Claims, 4 Drawing Sheets

TRACKING APPARATUS, METHOD, AND NON-TRANSITORY COMPUTER READABLE STORAGE MEDIUM THEREOF

BACKGROUND

Field of Invention

The present invention relates to a tracking apparatus, method, and non-transitory computer readable storage medium thereof. More particularly, the present invention relates to a tracking apparatus, method, and non-transitory computer readable storage medium thereof for extending a field of view of a head-mounted display.

Description of Related Art

In recent years, various technologies related to virtual reality have developed rapidly, and various technologies and applications of head-mounted displays have been proposed one after another. In the prior art, a head-mounted display with an inside-out tracking positioning can identify the spatial position (i.e., the position and orientation of a target object) of a target object (e.g., a handheld controller operated by the user) by using a plurality of image capturing devices configured on the head-mounted display.

However, the head-mounted display is generally configured with a fixed number of image capturing devices to generate a plurality of real-time images, and the real-time images are combined into a fixed field of view. Therefore, when the target object moves out of the field of view (i.e., the visual dead-zone) of the head-mounted display, the head-mounted display may lose the tracking of the spatial position of the target object, and thus causing a bad operating experience for the user.

For example, when there are few identifiable positioning features in the spatial environment (e.g., the head-mounted display faces a whole white wall) or when the target object leaves the field of view of the head-mounted display (e.g., the controller moves to the back side of the head-mounted display), which may cause the head-mounted display to lose the tracking of the target object. Since the head-mounted display cannot track the spatial position of the target object in real time, it may result in a poor user experience.

Accordingly, there is an urgent need for a tracking technology that can expand the field of view of the head-mounted display.

SUMMARY

An objective of the present disclosure is to provide a tracking apparatus. The tracking apparatus comprises an image capturing device and a processor, and the processor is electrically connected to the image capturing device. The image capturing device is configured to generate a real-time image corresponding to a field of view. The processor calculates a first pose information corresponding to a target object based on the real-time image in response to the target object appears in the field of view, wherein the target object is tracked by a head-mounted display. The processor transmits the first pose information to the head-mounted display to make the head-mounted display calculate a fusion pose information of the target object according to the first pose information.

Another objective of the present disclosure is to provide a tracking method, which is adapted for use in an electronic apparatus. The electronic apparatus comprises an image capturing device and a processor, the image capturing device is configured to generate a real-time image corresponding to a field of view. The tracking method comprises following steps: calculating a first pose information corresponding to a target object based on the real-time image in response to the target object appears in the field of view, wherein the target object is tracked by a head-mounted display; and transmitting the first pose information to the head-mounted display to make the head-mounted display calculate a fusion pose information of the target object according to the first pose information.

A further objective of the present disclosure is to provide a non-transitory computer readable storage medium having a computer program stored therein. The computer program comprises a plurality of codes, the computer program executes a tracking method after being loaded into an electronic computing apparatus. The electronic apparatus comprises an image capturing device and a processor, the image capturing device is configured to generate a real-time image corresponding to a field of view. The tracking method comprises following steps: calculating a first pose information corresponding to a target object based on the real-time image in response to the target object appears in the field of view, wherein the target object is tracked by a head-mounted display; and transmitting the first pose information to the head-mounted display to make the head-mounted display calculate a fusion pose information of the target object according to the first pose information.

According to the above descriptions, the tracking technology (at least including the apparatus, the method, and the non-transitory computer readable storage medium) provided by the present disclosure determines whether the target object tracked by the head-mounted display appears in the field of view, and calculates the first pose information corresponding to the target object. The apparatus transmits the first pose information to the head-mounted display, so as to assist the head-mounted display to calculate the fusion pose information of the target object according to the first pose information. The tracking technology provided by the present disclosure can expand the field of view of the head-mounted display, thereby solving the disadvantage that the head-mounted display may not be able to track the spatial position of the target object in real time in the prior art.

The detailed technology and preferred embodiments implemented for the subject disclosure are described in the following paragraphs accompanying the appended drawings for people skilled in this field to well appreciate the features of the claimed invention.

DETAILED DESCRIPTION

In the following description, a tracking apparatus, method, and non-transitory computer readable storage medium thereof according to the present disclosure will be explained with reference to embodiments thereof. However, these embodiments are not intended to limit the present disclosure to any environment, applications, or implementations described in these embodiments. Therefore, description of these embodiments is only for purpose of illustration rather than to limit the present disclosure. It shall be appreciated that, in the following embodiments and the attached drawings, elements unrelated to the present disclosure are omitted from depiction. In addition, dimensions of individual elements and dimensional relationships among individual elements in the attached drawings are provided only for illustration but not to limit the scope of the present disclosure.

Figure 1:
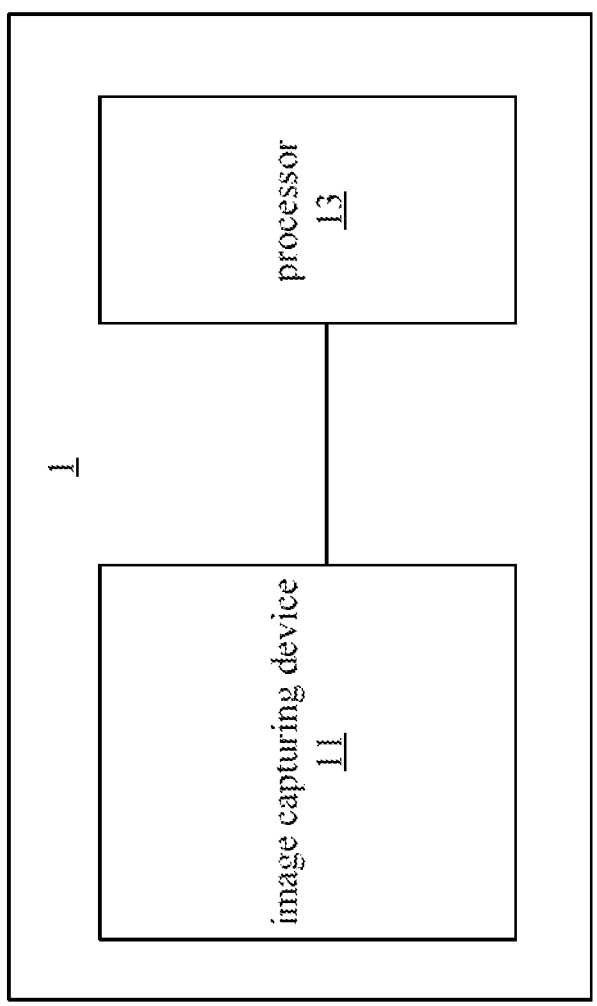
FIG. 1 is a schematic view depicting a tracking apparatus of the first embodiment.

A first embodiment of the present disclosure is a tracking apparatus 1 and a schematic view of which is depicted in FIG. 1. The tracking apparatus 1 comprises an image capturing device 11 and a processor 13, and the processor 13 is electrically connected to the image capturing device 11. The image capturing device 11 can be any device having an image capturing function. The processor 13 may be any of various processors, Central Processing Units (CPUs), microprocessors, digital signal processors or other computing apparatuses known to those of ordinary skill in the art.

It shall be appreciated that in the application environment of the present disclosure, a user can use a head-mounted display in a physical space, and manipulate an object (hereinafter referred to as a target object) to perform a virtual reality operation corresponding to the three-dimensional space of the physical space.

For example, the target object described in the present disclosure may be a handheld controller, a wearable controller (e.g., a wristband), a user's hand contour (e.g., the outline of the object identified by the identification operation) and so on.

In the present disclosure, the tracking apparatus 1 can be installed at any position in the physical space (e.g., installed in various corners of the physical space, areas with dense obstacles, possible visual dead-zone, etc.). In some embodiments, the tracking apparatus 1 can also be installed at certain positions of the head-mounted display (e.g., installed at the rear side of the head-mounted display). Therefore, the tracking apparatus 1 can capture a real-time image corresponding to the visual dead-zone of the head-mounted display in the physical space.

In the present embodiment, the image capturing device 11 of the tracking apparatus 1 may comprise a plurality of image capturing units (e.g., a plurality of depth camera lenses) for generating a real-time image corresponding to a field of view. For example, the image capturing device 11 may comprise three image capturing units disposed on the upper, the middle, and the lower sides of the tracking apparatus 1, and the field of view corresponding to the tracking apparatus 1 is composed of real-time images corresponding to the upper, the middle, and the lower sides.

In the present embodiment, the tracking apparatus 1 can periodically monitor (e.g., at a fixed frequency of 30 times per second) whether the target object tracked by the head-mounted display appears in the field of view of the tracking apparatus 1, and transmit the pose information of the target object to the head-mounted display.

Specifically, the processor 13 may determine whether the target object appears in the field of view based on the real-time image generated by the image capturing device 11, wherein the target object is tracked by the head-mounted display. Next, the processor 13 calculates a first pose information corresponding to the target object based on the real-time image in response to determining that the target object appears in the field of view. Finally, the processor 13 transmits the first pose information to the head-mounted display to make the head-mounted display calculate a fusion pose information of the target object according to the first pose information.

It shall be appreciated that the pose information disclosed in the present disclosure may comprise any information used to calculate the actual position and orientation of the target object in physical space. For example, the pose information may comprise a rotation value and a translation value.

It shall be appreciated that the processor 13 can calculate the pose information corresponding to the target object in various ways. For example, the processor 13 can calculate the actual position and orientation corresponding to the target object through the features of the target object in the real-time image (e.g., the arrangement of light-emitting elements on the controller, the preset identification features, etc.). Those of ordinary skill in the art shall appreciate the content of the pose information and the implementation of calculating the pose information based on the foregoing descriptions. Therefore, the details will not be repeated herein.

In some embodiments, in order to save computing resources, the head-mounted display calculates the fusion pose information of the target object according to the first pose information received from the tracking apparatus 1 only when it is determined that the tracking of the target object is lost.

In some embodiments, in order to make the tracking apparatus 1 recognize the target object more quickly, the tracking apparatus 1 may first receive the pose information corresponding to the target object from the head-mounted display (e.g., the pose information of the target object in the previous time period), so as to improve the efficiency of the tracking apparatus 1 to determine the target object. Specifically, the processor 13 receives a second pose information corresponding to the target object from the head-mounted display. Next, the processor 13 determines whether the target object tracked by the head-mounted display appears in the field of view based on the second pose information and the real-time image.

In some embodiments, in order to make the positioning information of the tracking apparatus 1 in the physical space more accurate, the tracking apparatus 1 can perform a calibration operation through a spatial image transmitted by the head-mounted display. Next, the tracking apparatus 1 converts its own spatial coordinates correspondingly, so that the reference spatial coordinate of the tracking apparatus 1 is the same as that of the head-mounted display (i.e., the spatial map of the tracking apparatus 1 is aligned with the spatial coordinates corresponding to the head-mounted display).

Figure 2:
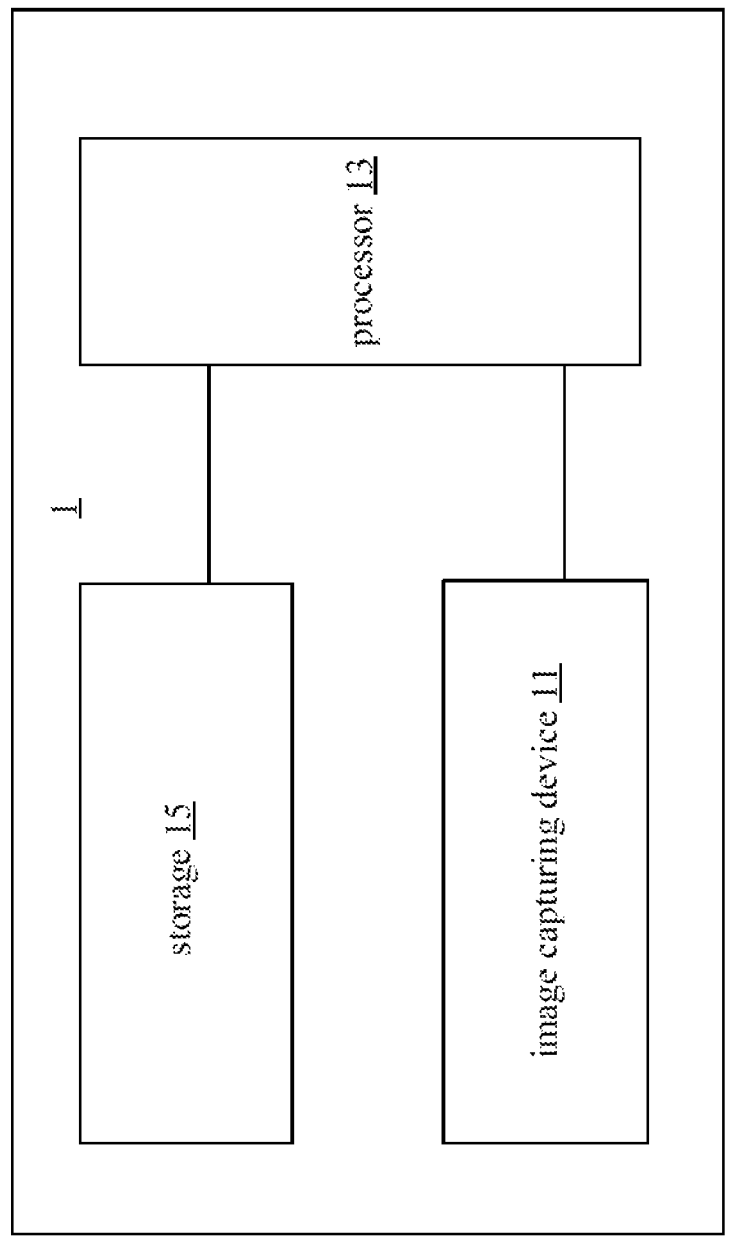
FIG. 2 is a schematic view depicting a tracking apparatus of some embodiments.

For ease of understanding, as shown in FIG. 2, the tracking apparatus 1 may further comprise a storage 15, and the storage 15 is electrically connected to the processor 13. The storage 15 may be a memory, a Universal Serial Bus (USB) disk, a hard disk, a Compact Disk (CD), a mobile disk, or any other storage medium or circuit known to those of ordinary skill in the art and having the same functionality.

Specifically, the storage 15 can be used to store a spatial map corresponding to the physical space. The spatial map comprises a plurality of spatial images (hereinafter referred to as the second spatial images) and a pose information corresponding to each of the second spatial images (hereinafter referred to as the fourth pose information).

First, the processor 13 receives a map packet from the head-mounted display, and the map packet comprises a spatial image generated by the head-mounted display (hereinafter referred to as the first spatial image) and the pose information corresponding to the first spatial image (hereinafter referred to as the third pose information).

Next, the processor 13 selects a spatial image that is consistent with the first spatial image from the second spatial images in the spatial map to perform subsequent coordinate calibration operations. Specifically, the processor 13 compares the first spatial image with the second spatial images in the spatial map to determine whether the second spatial images have a target spatial image (i.e., the spatial image used as the calibration standard).

Next, the processor 13 calculates a conversion parameter based on the fourth pose information corresponding to the target spatial image and the third pose information corresponding to the first spatial image when determining that the second spatial images have the target spatial image that matches the first spatial image. It shall be appreciated that the conversion parameter may comprise a rotation value and a translation value, and the processor 13 may convert the fourth pose information corresponding to the target spatial image into the third pose information of the first spatial image based on the conversion parameter.

Finally, based on the conversion parameter, the processor 13 may convert the spatial images comprised in the spatial map for calibration. Specifically, the processor 13 converts the fourth pose information corresponding to each of the second spatial images to calibrate the spatial map based on the conversion parameter.

In some embodiments, if the tracking apparatus 1 and the head-mounted display have a fixed positional relationship (e.g., the tracking apparatus 1 is set at a fixed position of the head-mounted display), and when the head-mounted display cannot correctly identify its current position in the physical space, the head-mounted display can estimate the actual position of the head-mounted display by using the pose information periodically returned by the tracking apparatus 1. Specifically, the processor 13 of the tracking apparatus 1 may periodically transmit the pose information corresponding to the tracking apparatus 1 (hereinafter referred to as the fifth pose information) to the head-mounted display based on a predetermined period (e.g., at a fixed frequency of 30 times per second), and the head-mounted display calibrates the pose information of the head-mounted display (hereinafter referred to as the sixth pose Information) based on the fifth pose information when the head-mounted display determines that the tracking apparatus and the head-mounted display have a fixed positional relationship.

For example, in the case that the head-mounted display faces an entire white wall, the head-mounted display may not correctly identify the current position of the head-mounted display itself in the physical space (i.e., there are few positioning features that can be identified in the spatial environment), and the head-mounted display may be positioned through the pose information periodically returned by the tracking apparatus 1 located on the rear side of the head-mounted display.

In some embodiments, in order to identify the state of the target object more accurately (e.g., the finer rotation and translation), an inertial measurement unit (IMU) can be installed on the target object, and thus the head-mounted display may calculate the fusion pose information based on different information.

Specifically, an inertial measurement unit may be installed on the target object (e.g., a handheld controller) for generating a series of inertial measurement parameters (e.g., a stream of inertial measurement parameters). During the operation, the head-mounted display may regularly receive a series of inertial measurement parameters corresponding to the target object, so as to calculate the fusion pose information according to the first pose information and the series of inertial measurement parameters.

It shall be appreciated that since the series of inertial measurement parameters are used to detect the finer moving of the target object, the return frequency of the series of inertial measurement parameters is usually greater than the return frequency of the first pose information. Generally speaking, the head-mounted display calculates the actual position and orientation of the target object in the physical space based on the first pose information, and further calculates the finer moving of the target object based on the series of inertial measurement parameters.

Figure 3:
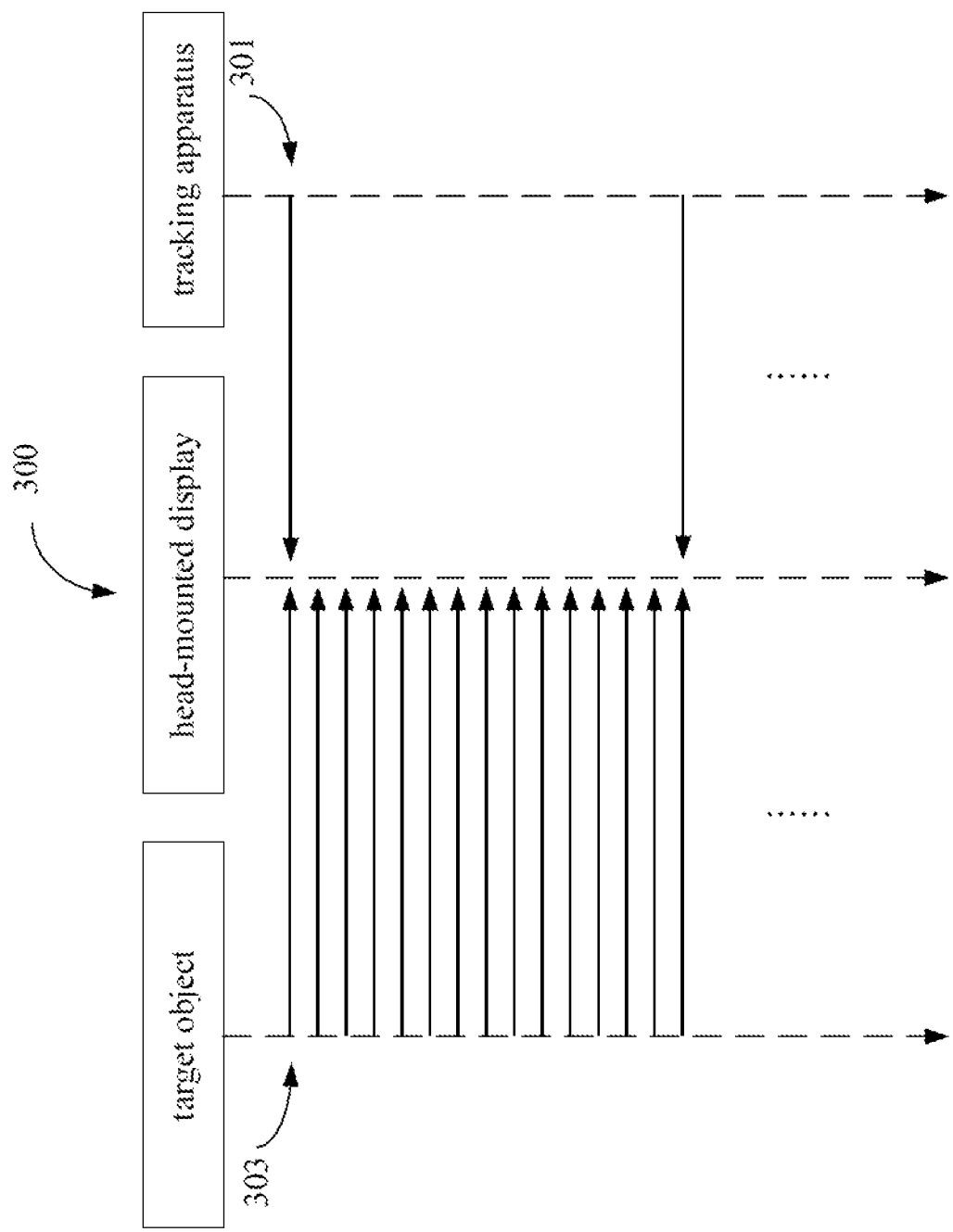
FIG. 3 is a sequence diagram depicting a data transmission of some embodiments.

For ease of understanding, FIG. 3 is taken as an example. FIG. 3 illustrates a sequence diagram 300 depicting a data transmission. As shown in FIG. 3, the head-mounted display periodically receives the first pose information 301 from the tracking apparatus 1 at a frequency of once every 30 ms. In addition, the head-mounted display periodically receives the series of inertial measurement parameters 303 from an inertial measurement unit on the target object at a frequency of once every 2 ms. Accordingly, the head-mounted display may calculate the fusion pose information based on the first pose information 301 and the series of inertial measurement parameters 303.

According to the above descriptions, the tracking apparatus 1 provided by the present disclosure determines whether the target object tracked by the head-mounted display appears in the field of view, and calculates the first pose information corresponding to the target object. The tracking apparatus 1 transmits the first pose information to the head-mounted display, so as to assist the head-mounted display to calculate the fusion pose information of the target object according to the first pose information. The tracking apparatus 1 provided by the present disclosure can expand the field of view of the head-mounted display, thereby solving the disadvantage that the head-mounted display may not be able to track the spatial position of the target object in real time in the prior art.

Figure 4:
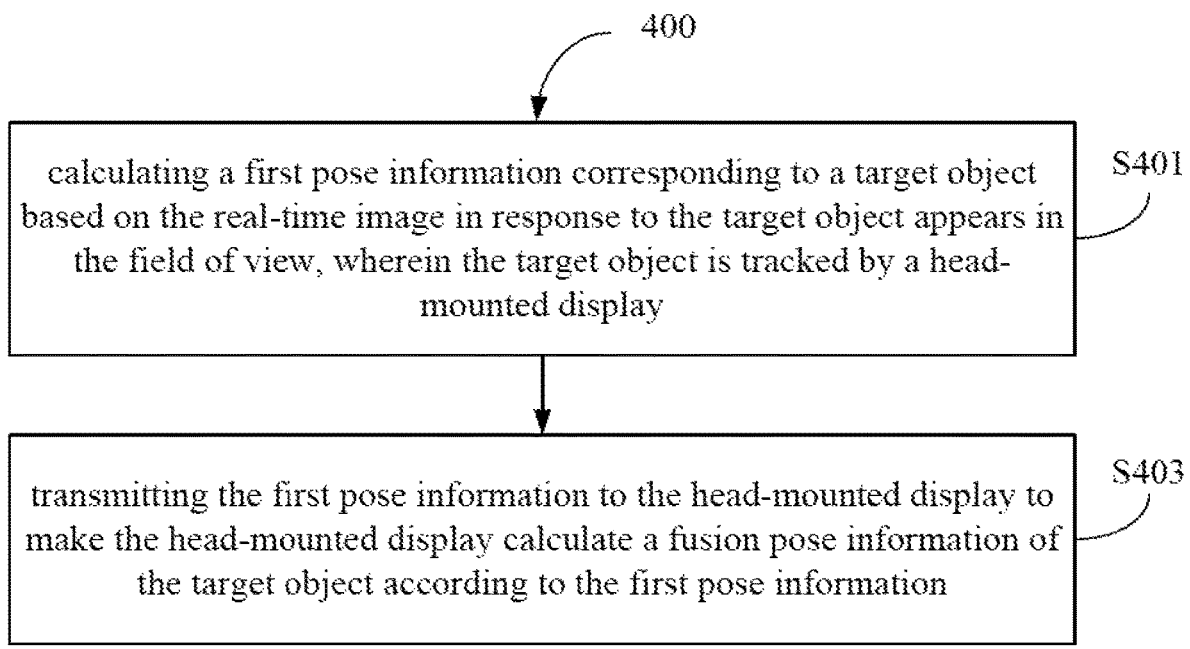
FIG. 4 is a partial flowchart depicting a tracking method of the second embodiment.

A second embodiment of the present disclosure is a tracking method and a flowchart thereof is depicted in FIG. 4. The tracking method 400 is adapted for an electronic apparatus (e.g., the tracking apparatus 1 of the first embodiment). The electronic apparatus comprises an image capturing device and a processor. The image capturing device is configured to generate a real-time image corresponding to a field of view. The tracking method 400 transmits the pose information to the head-mounted display through the steps S401 to S403.

In the step S401, the electronic apparatus calculates a first pose information corresponding to a target object based on the real-time image in response to the target object appears in the field of view, wherein the target object is tracked by a head-mounted display.

Next, in the step S403, the electronic apparatus transmits the first pose information to the head-mounted display to make the head-mounted display calculate a fusion pose information of the target object according to the first pose information.

In some embodiments, the tracking method 400 further comprises following steps: receiving a second pose information corresponding to the target object from the head-mounted display; and determining whether the target object tracked by the head-mounted display appears in the field of view based on the second pose information and the real-time image.

In some embodiments, the electronic apparatus further comprises a storage, the storage is configured to store a spatial map, and the tracking method 400 further comprises following steps: receiving a map packet from the head-mounted display; and calibrating the spatial map based on the map packet to align the spatial map with a spatial coordinate corresponding to the head-mounted display.

In some embodiments, the map packet comprises a first spatial image and a third pose information corresponding to the first spatial image, and the spatial map comprises a plurality of second spatial images and a fourth pose information corresponding to each of the second spatial images.

In some embodiments, the tracking method 400 further comprises following steps: comparing the first spatial image with the second spatial images in the spatial map to determine whether the second spatial images have a target spatial image that matches the first spatial image; calculating a conversion parameter based on the fourth pose information corresponding to the target spatial image and the third pose information corresponding to the first spatial image when determining that the second spatial images have the target spatial image that matches the first spatial image; and converting the fourth pose information corresponding to each of the second spatial images to calibrate the spatial map based on the conversion parameter.

In some embodiments, the tracking method 400 further comprises following steps: periodically transmitting a fifth pose information corresponding to the electronic apparatus to the head-mounted display based on a predetermined period; wherein the head-mounted display calibrates a corresponding sixth pose information of the head-mounted display based on the fifth pose information when the head-mounted display determines that the electronic apparatus and the head-mounted display have a fixed positional relationship.

In some embodiments, the first pose information comprises a rotation value and a translation value.

In some embodiments, the head-mounted display is further configured to receive a series of inertial measurement parameters corresponding to the target object, and configured to calculate the fusion pose information according to the first pose information and the series of inertial measurement parameters.

In addition to the aforesaid steps, the second embodiment can also execute all the operations and steps of the tracking apparatus 1 set forth in the first embodiment, have the same functions, and deliver the same technical effects as the first embodiment. How the second embodiment executes these operations and steps, has the same functions, and delivers the same technical effects will be readily appreciated by those of ordinary skill in the art based on the explanation of the first embodiment. Therefore, the details will not be repeated herein.

The tracking method described in the second embodiment may be implemented by a computer program having a plurality of codes. The computer program may be a file that can be transmitted over the network, or may be stored into a non-transitory computer readable storage medium. After the codes of the computer program are loaded into an electronic apparatus (e.g., the tracking apparatus 1), the computer program executes the tracking method as described in the second embodiment. The non-transitory computer readable storage medium may be an electronic product, e.g., a read only memory (ROM), a flash memory, a floppy disk, a hard disk, a compact disk (CD), a mobile disk, a database accessible to networks, or any other storage medium with the same function and well known to those of ordinary skill in the art.

It shall be appreciated that in the specification and the claims of the present disclosure, some words (e.g., pose information and spatial image) are preceded by terms such as "first", "second", "third", "fourth", "fifth, and "sixth", and these terms of "first", "second", "third", "fourth", "fifth, and "sixth" are only used to distinguish these different words. For example, the "first" and "second" spatial images are only used to indicate the spatial images used in different operations.

According to the above descriptions, the tracking technology (at least including the apparatus, the method, and the non-transitory computer readable storage medium) provided by the present disclosure determines whether the target object tracked by the head-mounted display appears in the field of view, and calculates the first pose information corresponding to the target object. The apparatus transmits the first pose information to the head-mounted display, so as to assist the head-mounted display to calculate the fusion pose information of the target object according to the first pose information. The tracking technology provided by the present disclosure can expand the field of view of the head-mounted display, thereby solving the disadvantage that the head-mounted display may not be able to track the spatial position of the target object in real time in the prior art.

The above disclosure is related to the detailed technical contents and inventive features thereof. People skilled in this field may proceed with a variety of modifications and replacements based on the disclosures and suggestions of the disclosure as described without departing from the characteristics thereof. Nevertheless, although such modifications and replacements are not fully disclosed in the above descriptions, they have substantially been covered in the following claims as appended.

Although the present disclosure has been described in considerable detail with reference to certain embodiments thereof, other embodiments are possible. Therefore, the spirit and scope of the appended claims should not be limited to the description of the embodiments contained herein.

It will be apparent to those skilled in the art that various modifications and variations can be made to the structure of the present disclosure without departing from the scope or spirit of the disclosure. In view of the foregoing, it is intended that the present disclosure cover modifications and variations of this disclosure provided they fall within the scope of the following claims.

What is claimed is:

1. A tracking apparatus, comprising:
   an image capturing device, being configured to generate a real-time image corresponding to a field of view; and
   a processor, being electrically connected to the image capturing device, and being configured to perform operations comprising:
      calculating a first pose information corresponding to a target object based on the real-time image in response to the target object appears in the field of view, wherein the target object is tracked by a head-mounted display; and
      transmitting the first pose information to the head-mounted display to make the head-mounted display calculate a fusion pose information of the target object according to the first pose information;
   wherein the head-mounted display is further configured to receive a series of inertial measurement parameters corresponding to the target object, and configured to calculate the fusion pose information according to the first pose information and the series of inertial measurement parameters, the series of inertial measurement parameters are generated by an inertial measurement unit installed on the target object, the series of inertial measurement parameters are used to detect a finer moving of the target object, and a return frequency of the series of inertial measurement parameters is greater than the return frequency of the first pose information;

wherein the processor is further configured to perform following operations:

receiving a second pose information corresponding to the target object from the head-mounted display before determining whether the target object tracked by the head-mounted display appears in the field of view, wherein the second pose information comprises a pose information of the target object in a previous time period; and determining whether the target object tracked by the head-mounted display appears in the field of view corresponding to the image capturing device comprised in the tracking apparatus based on the second pose information and the real-time image, wherein the target object is manipulated by a user using the head-mounted display, the target object is a handheld controller, a wearable controller, or a user's hand contour, and the head-mounted display and the target object correspond to the same user;

wherein the tracking apparatus further comprises:

a storage, being electrically connected to the processor, and being configured to store a spatial map;

wherein the processor is further configured to perform the following operations:

receiving a map packet from the head-mounted display; and calibrating the spatial map based on the map packet to align the spatial map with a spatial coordinate corresponding to the head-mounted display.

2. The tracking apparatus of claim 1, wherein the map packet comprises a first spatial image and a third pose information corresponding to the first spatial image, and the spatial map comprises a plurality of second spatial images and a fourth pose information corresponding to each of the second spatial images.

3. The tracking apparatus of claim 2, wherein the processor is further configured to perform following operations:

comparing the first spatial image with the second spatial images in the spatial map to determine whether the second spatial images have a target spatial image that matches the first spatial image;

calculating a conversion parameter based on the fourth pose information corresponding to the target spatial image and the third pose information corresponding to the first spatial image when determining that the second spatial images have the target spatial image that matches the first spatial image; and converting the fourth pose information corresponding to each of the second spatial images to calibrate the spatial map based on the conversion parameter.

4. The tracking apparatus of claim 1, wherein the processor is further configured to perform following operations:

periodically transmitting a fifth pose information corresponding to the tracking apparatus to the head-mounted display based on a predetermined period;

wherein the head-mounted display calibrates a corresponding sixth pose information of the head-mounted display based on the fifth pose information when the head-mounted display determines that the tracking apparatus and the head-mounted display have a fixed positional relationship.

5. The tracking apparatus of claim 1, wherein the first pose information comprises a rotation value and a translation value.

6. A tracking method, being adapted for use in an electronic apparatus, wherein the electronic apparatus comprises an image capturing device and a processor, the image capturing device is configured to generate a real-time image corresponding to a field of view, and the tracking method comprises:

calculating a first pose information corresponding to a target object based on the real-time image in response to the target object appears in the field of view, wherein the target object is tracked by a head-mounted display; and transmitting the first pose information to the head-mounted display to make the head-mounted display calculate a fusion pose information of the target object according to the first pose information;

wherein the head-mounted display is further configured to receive a series of inertial measurement parameters corresponding to the target object, and configured to calculate the fusion pose information according to the first pose information and the series of inertial measurement parameters, the series of inertial measurement parameters are generated by an inertial measurement unit installed on the target object, the series of inertial measurement parameters are used to detect a finer moving of the target object, and a return frequency of the series of inertial measurement parameters is greater than the return frequency of the first pose information;

wherein the tracking method further comprises following steps:

receiving a second pose information corresponding to the target object from the head-mounted display before determining whether the target object tracked by the head-mounted display appears in the field of view, wherein the second pose information comprises a pose information of the target object in a previous time period; and determining whether the target object tracked by the head-mounted display appears in the field of view corresponding to the image capturing device comprised in the electronic apparatus based on the second pose information and the real-time image, wherein the target object is manipulated by a user using the head-mounted display, the target object is a handheld controller, a wearable controller, or a user's hand contour, and the head-mounted display and the target object correspond to the same user;

wherein the electronic apparatus further comprises a storage, the storage is configured to store a spatial map, and the tracking method further comprises the following steps:

receiving a map packet from the head-mounted display; and calibrating the spatial map based on the map packet to align the spatial map with a spatial coordinate corresponding to the head-mounted display.

7. The tracking method of claim 6, wherein the map packet comprises a first spatial image and a third pose information corresponding to the first spatial image, and the spatial map comprises a plurality of second spatial images and a fourth pose information corresponding to each of the second spatial images.

8. The tracking method of claim 7, wherein the tracking method further comprises following steps:
comparing the first spatial image with the second spatial images in the spatial map to determine whether the second spatial images have a target spatial image that matches the first spatial image;
calculating a conversion parameter based on the fourth pose information corresponding to the target spatial image and the third pose information corresponding to the first spatial image when determining that the second spatial images have the target spatial image that matches the first spatial image; and
converting the fourth pose information corresponding to each of the second spatial images to calibrate the spatial map based on the conversion parameter.

9. The tracking method of claim 6, wherein the tracking method further comprises following steps:
periodically transmitting a fifth pose information corresponding to the electronic apparatus to the head-mounted display based on a predetermined period;
wherein the head-mounted display calibrates a corresponding sixth pose information of the head-mounted display based on the fifth pose information when the head-mounted display determines that the electronic apparatus and the head-mounted display have a fixed positional relationship.

10. The tracking method of claim 6, wherein the first pose information comprises a rotation value and a translation value.

11. A non-transitory computer readable storage medium, having a computer program stored therein, wherein the computer program comprises a plurality of codes, the computer program executes a tracking method after being loaded into an electronic apparatus, the electronic apparatus comprises an image capturing device and a processor, the image capturing device is configured to generate a real-time image corresponding to a field of view, the tracking method comprises:
calculating a first pose information corresponding to a target object based on the real-time image in response to the target object appears in the field of view, wherein the target object is tracked by a head-mounted display; and
transmitting the first pose information to the head-mounted display to make the head-mounted display calculate a fusion pose information of the target object according to the first pose information;
wherein the head-mounted display is further configured to receive a series of inertial measurement parameters corresponding to the target object, and configured to calculate the fusion pose information according to the first pose information and the series of inertial measurement parameters, the series of inertial measurement parameters are generated by an inertial measurement unit installed on the target object, the series of inertial measurement parameters are used to detect a finer moving of the target object, and a return frequency of the series of inertial measurement parameters is greater than the return frequency of the first pose information;
wherein the tracking method further comprises following steps:
receiving a second pose information corresponding to the target object from the head-mounted display before determining whether the target object tracked by the head-mounted display appears in the field of view, wherein the second pose information comprises a pose information of the target object in a previous time period; and
determining whether the target object tracked by the head-mounted display appears in the field of view corresponding to the image capturing device comprised in the electronic apparatus based on the second pose information and the real-time image, wherein the target object is manipulated by a user using the head-mounted display, the target object is a handheld controller, a wearable controller, or a user's hand contour, and the head-mounted display and the target object correspond to the same user;
wherein the electronic apparatus further comprises a storage, the storage is configured to store a spatial map, and the tracking method further comprises the following steps:
receiving a map packet from the head-mounted display; and
calibrating the spatial map based on the map packet to align the spatial map with a spatial coordinate corresponding to the head-mounted display.

12. The non-transitory computer readable storage medium of claim 11, wherein the tracking method further comprises following steps:
periodically transmitting a fifth pose information corresponding to the electronic apparatus to the head-mounted display based on a predetermined period;
wherein the head-mounted display calibrates a corresponding sixth pose information of the head-mounted display based on the fifth pose information when the head-mounted display determines that the electronic apparatus and the head-mounted display have a fixed positional relationship.

* * * * *